United States Patent [19]

Garcia et al.

[11] Patent Number: 5,082,350
[45] Date of Patent: Jan. 21, 1992

[54] REAL TIME THREE DIMENSIONAL DISPLAY SYSTEM FOR DISPLAYING IMAGES IN THREE DIMENSIONS WHICH ARE PROJECTED ONTO A SCREEN IN TWO DIMENSIONS

[75] Inventors: Felix Garcia, Round Rock; Rodney D. Williams, Plano, both of Tex.

[73] Assignee: Texas Instruments Incorporated, Dallas, Tex.

[21] Appl. No.: 409,176

[22] Filed: Sep. 19, 1989

Related U.S. Application Data

[63] Continuation-in-part of Ser. No. 584,413, Sep. 17, 1990, which is a continuation of Ser. No. 390,473, Aug. 3, 1989, which is a continuation of Ser. No. 231,638, Aug. 8, 1988, abandoned, which is a continuation of Ser. No. 105,924, Oct. 7, 1987, abandoned.

[51] Int. Cl.$^5$ .............................................. H04N 13/04
[52] U.S. Cl. .................................. 359/478; 358/88; 358/89; 359/446
[58] Field of Search ................. 350/144; 353/7, 10; 340/724, 727; 358/88, 89, 90; 434/44, 43

[56] References Cited

U.S. PATENT DOCUMENTS

| | | | |
|---|---|---|---|
| 3,097,261 | 7/1963 | Schipper et al. | |
| 3,140,415 | 7/1964 | Ketchpel | 358/88 X |
| 3,583,784 | 6/1971 | Vestal | 434/44 X |
| 3,956,833 | 5/1976 | Chase | 434/43 |
| 4,055,004 | 10/1977 | Chase | 434/43 X |
| 4,130,832 | 12/1978 | Sher | 358/89 |
| 4,821,231 | 10/1989 | Garcia, Jr. | 358/3 X |
| 4,922,336 | 5/1990 | Morton | 358/89 X |

OTHER PUBLICATIONS

"Two- and Three-Dimensional Image Display", IBM Technical Disclosure Bulletin, vol. 29, No. 10, Mar. 1987, p. 4326.

"Terminal Puts Three-Dimensional Graphics on Solid Ground", Stover; Reprinted From *Electronics*, Jul. 1981.

*Primary Examiner*—Victor R. Kostak
*Attorney, Agent, or Firm*—L. Joy Griebenow; James T. Comfort; Richard L. Donaldson

[57] ABSTRACT

A three dimensional display system is shown wherein a scanned light beam is displayed upon a continuously rotating display member rotating about a fixed axis. A first embodiment provides that the display member be comprised of a pair of intersecting display surfaces. In further version the display member is fixedly positioned in a spherical enclosure which is rotatable in two different directions. In a second embodiment, the display member is formed by a bundle of fiber optic elements extending from an image projector to a viewing surface. The optical fiber bundle can be formed so that the image receiving portion has a smaller cross section than the image transmitting portion. In a third embodiment, the angle formed between the display member and the axis about which it rotates is adjusted, on or off line, by changing the length of an adjustable rod secured to the display member and a member rotating with the display member. In a fourth embodiment, a three dimensional display and two dimensional display are combined in conjunction with an optical combiner. In a fifth embodiment, the light is transmitted to the rotating disc through a pair of changeable rotating apertured disks wherein the apertures are aligned. In a further embodiment of the invention, the screen is formed from a pair of symmetrical stepped disks in the shape of a helically shaped half circle.

56 Claims, 5 Drawing Sheets

REAL TIME THREE DIMENSIONAL DISPLAY SYSTEM FOR DISPLAYING IMAGES IN THREE DIMENSIONS WHICH ARE PROJECTED ONTO A SCREEN IN TWO DIMENSIONS

CROSS REFERENCE TO RELATED APPLICATIONS

This application is continuation-in-part of Ser. No. 584,413, filed Sept. 17, 1990, which is a continuation of Ser. No. 390,473, filed Aug. 3, 1989, which is a continuation of Ser. No. 231,638, filed Aug. 8, 1988, now abandoned, which is a continuation of Ser. No. 105,924, filed Oct. 7, 1987, now abandoned, the specifications of which are incorporated herein in their entirety by reference.

BACKGROUND OF THE INVENTION

1. Field of the invention

This invention relates to a three dimensional display system and, more specifically, to a system capable of displaying images in three dimensions which are projected onto a screen in two dimensions.

2. Brief Description of the Prior Art

It has been known in the prior art to modulate or scan a beam, such as a laser beam and then to project the scanned beam onto a screen. Examples of such systems are set forth in Baker U.S. Pat. Nos. 3,471,641 and 3,549,800.

It has also been long desired to provide a three dimensional display. Prior art systems for creating such a display have involved moving a flat plate mirror or flexing a plastic mirror to reflect a CRT image to create a volume display. Similar techniques have employed a Mylar membrane stretched over a metal ring and silvered on the front surface, such mirror being vibrated to reflect the information displayed on the CRT in synchronism with the mirror motion. Such techniques and techniques for converting a cathode ray tube two dimensional display into a three dimensional image are discussed in the article "Terminal Puts 3-Dimensional Graphics on Solid Ground", by Harry S. Stover, *Electronics*, July 28, 1981.

Prior art three dimensional display techniques were limited because of their use with CRT screens in that the produced image may be viewed only from selected angles. Moreover, such prior art systems have generally not been able to produce real time images and have been limited in the possible vibration frequencies of the screens. Moreover, the use of vibrating mirrors has created difficulties due to the relatively large mass of the mirrors which prevent substantial deflections. For example, such prior art systems have generally been capable of providing a mirror displacement of about 0.4 millimeters.

A need thus arose for a simple and economical three dimensional display system that could produce substantial displacement at a variety of frequencies in order to provide three dimensional images which can be viewed from all angles. U.S. Pat. Nos. 1,794,103, 3,682,553 and 3,970,361 set forth typical prior art displays of the above noted type. Such prior art systems were generally limited as to the size of the imaqe displayed and is affected by G forces, thereby presenting problems in environments where G forces exist, such as in aircraft.

The above noted problems of the prior art were minimized and there was provided a three dimensional display system which was not substantially affected by G forces and wherein the size of the displayed image and screen is determined by the size of a disk and motor. This system is set forth in the above cited related application of Felix Garcia, Ser. No. 231,638, filed Aug. 8, 1988. The system in accordance with the invention in that application can be used, for example, in business and industry uses, such as solid animation, radar display, molecular research, resonant frequency and harmonics display, military, computer graphics, and the like.

The system in accordance with a first embodiment thereof includes a disk-like screen connected to the end of a motor shaft. The disk is attached to the shaft of a motor at a 45 degree angle, although this angle can be varied to provide a larger or smaller height or z-axis dimension, so that, as the disk rotates, a displacement of any given point thereon along the z axis takes place. The image is formed on the screen by projecting a light beam, such as from a laser, through a modulator and toward a scanner which produces an x-y scan of the beam on a screen, the screen therein being the disk discussed hereinabove. The disk can be translucent, such as lucite, so that images can be projected thereon onto the front and/or rear surfaces thereof. The modulation or strobing of the scan is then synchronized with the rotating disk by control of the motor speed so that a three dimensional pattern appears on the screen. It can be seen that any point on the x-y scan from the scanner which impinges upon the screen will move along a z-axis direction since the screen or disk at that point produces such z-axis movement. This movement of the displayed image provides the three dimensional effect. The adjustment of the angle between the disk surface and the x-y plane of the scanned x-y image will determine the z-dimension or height of the three dimensional image, the disk angle being adjustable on-line, if so desired.

While the disk therein is a planar opaque screen for receiving a scanned image thereon on one surface thereof, the screen can take many other forms. For example, the disk can be translucent, such as lucite, and thereby capable of receiving a scanned image thereon on both major surfaces. The lucite disk can be in the form of a pair of angularly truncated cylinders with the same which fit together at the angularly truncated surfaces to form a new cylinder wherein the surfaces at which truncation takes place are translucent. In addition, the screen can take on shapes other than planar, it merely being necessary that at least some portion thereof move in the z-direction during rotation thereof while projection of the x-y image thereon takes place to provide the three dimensional image. As a further embodiment, the disk can be placed in a gas-filled CRT with the image impinging thereon being the scanned beam of the tube. Phosphors can be disposed on the disk which, when excited, will form the three dimensional image. As a still further embodiment, the screen can be planar and disposed normal to the projected x-y image. The three dimensional affect is then provided by moving the entire screen along the z-axis in synchronism with the scanned x-y image to provide the three dimensional affect. A cam driven shaft attached to the screen can provide such screen movement along the z-axis.

While the above described prior art provides a surprisingly realistic real time three dimensional display, it is readily apparent that two conical areas extending upwardly and downwardly from the axis of rotation of the screen are incapable of receiving a portion of the display. In addition, the display cannot appear along the center point of rotation since the display does not move along the axis at this point. A still further problem is that of altering the angle of the disk easily or on-line to alter the volume traversed by the disk during rotation to control the volume displaced by the display. A yet further problem with the cited prior art is that an observer cannot simultaneously view the three dimensional display as well as a separate two dimensional display superimposed thereon.

SUMMARY OF THE INVENTION

In accordance with the present invention, the above noted problems of the prior art are minimized and there are provided improvements in the above described prior art to minimize the problems therein as set forth hereinabove.

Briefly, in accordance with one embodiment of the present invention, there is provided a display system as in the above noted pending application, further including a second disk which intersects the first disk preferably at right angles or at an acute angle along a line on the surface of the first disk. A straight line through the center of the first disk and at an acute angle to the axis of rotation of the first disk is the preferred such line. The second disk can take other shapes, such as, but not limited to, rectangular, oval, triangular, etc. The first and second disks can be enclosed in a solid clear material, preferably but not limited to a spherical shape so that the enclosure with disks therein can be rotated from the exterior of the enclosure. Alternatively, a rotating shaft of the type set forth in the above noted pending application and secured to the first disk can be used. The above described embodiment in the enclosure can be provided with two degrees of rotation by providing a pair of driving members for driving the enclosure in different directions simultaneously or at different times. In this arrangement, the enclosure would be secured against movements other than rotation about its center point in at least two directions and preferably in all directions.

The above described disk arrangement can be changed to provide a first split half-helix design wherein triangular members are positioned one above the other in stepped relation, the steps being formed of flat parallel sheets and being in a semicircular orientation. A second split half-helix design is provided which is identical to the first split half-helix but is symmetrical thereto and forms the remainder of the circle therewith. This design provides the harmonic motion and resulting 2X multiplier with full volume addressability of the helix.

In accordance with a second embodiment of the invention, the output of the x-y scanner of the above noted pending application is applied to a rotating bank of fiber optic elements. In this embodiment, the scanner is preferably a cathode ray tube or imagery projector with the receiving end of all of the fiber optic elements of the fiber optic bank being coplanar with each other and receiving the signal from the scanner. In this embodiment the transmitting ends of the fiber optic elements are preferably, though not necessarily in a single plane which makes an acute angle with the receiving ends of these elements. The bank of fiber optic elements is preferably in the shape of a truncated cylinder with one flat surface at an acute angle to the other flat surface. The fiber optic bank is secured against any movement other than rotation around its axis, preferably via a force to provide a rotary force thereto around said axis. The display from the transmitting end of the fiber optic bank can be enlarged relative to the receiving end thereof at the scanner by compressing each fiber optic element in the direction from transmitting end to receiving end. Alternatively, the fiber optic elements can be compressed together at the receiving ends and spread apart from each other at the viewed end to provide an enlarged image.

In accordance with a third embodiment of the invention, the display disk is secured to one end by a rod of adjustable length, the other end of the rod being secured to a member which rotates with the disk. The axis of rotation of the disk is secured to a rotating member such that the disk can move to a selectively adjustable angle relative to the axis of rotation by adjustment of the length of the rod. The length of the rod can be adjusted manually or electrically, either on or off line.

In accordance with a fourth embodiment of the invention, there is provided a system for simultaneous viewing of both a three dimensional display of the type set forth in the above noted pending application or the like along with a separate two dimensional display which can be displayed thereover. In this embodiment, the three dimensional display is provided in the manner discussed hereinabove in connection with the prior art and viewed by the viewer through a beam splitter. A second two dimensional display is projected onto the same optical combiner from an angle which is preferably normal to the direction of the three dimensional display on the combiner at which has at least a component of the display therefrom normal to the direction of the three dimensional display. The resultant image will be a combination of the two displays superimposed upon each other.

In accordance with a fifth embodiment of the invention, there is provided a light source which can be LEDs, an incandescent light bulb or the like. This light is modulated by a pair of spinning apertured disks positioned one atop the other with overlapping apertures. The light from the light source passes through the spinning disks when the apertures are aligned and impinges upon a spinning disk which is disposed at an acute angle to the direction of light through the apertures. This provides a three dimensional effect in the volume occupied by the rotating disk in the same manner as described hereinabove and in the above noted copending application. The apertured disks can be replaced to provide different images on the disk. This device is useful in teaching of solid geometry, physics, astronomy and other areas where it is difficult to visualize three dimensional objects which are presented in a two dimensional format.

DESCRIPTION OF THE PREFERRED EMBODIMENTS

Figure 1:
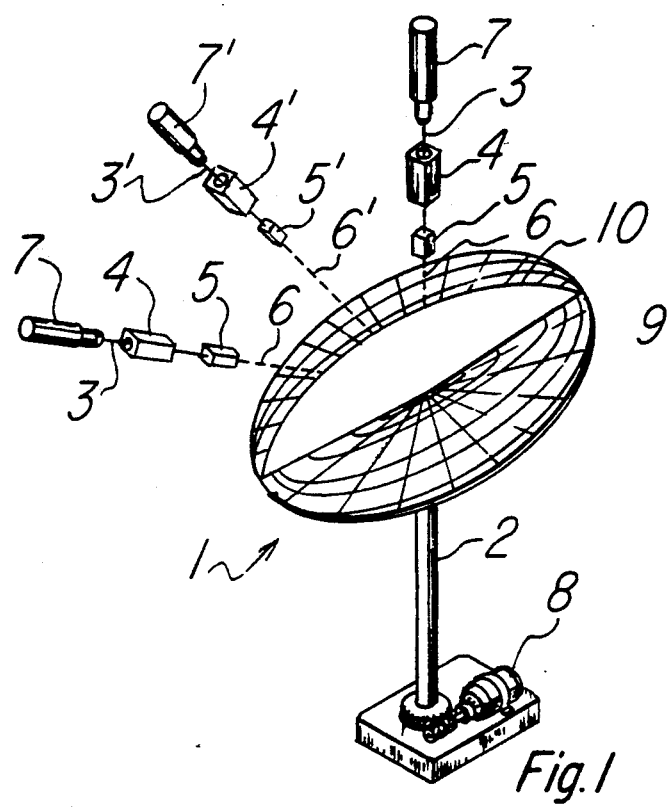
FIG. 1 is a schematic diagram of a three dimensional display system utilizing a screen in accordance with a first version of a first embodiment of the present invention.

Referring now to FIG. 1, there is shown a schematic diagram of a system in accordance with a first version of the present invention. The system includes a first light source comprising a laser 7 which projects a light beam through a modulator 4 onto an x-y scanner 5. The modulator 4 is externally controlled in predetermined manner (not shown) to control the intensity of the laser light beam 3 passing therethrough. It is understood that the light intensity can be controlled so that no light passes through, when so desired. The x-y scanner 5, whose scanning rate is externally controllable in standard manner (not shown), scans the light beam 3 from the modulator 4 along an x-y plane and projects this x-y image 6 onto a screen 1 in the form of a pair of intersecting disks as will be explained hereinbelow. All of the structure described to this point except for the particular screen is well known and described in the above noted prior art and elsewhere.

Figure 2:
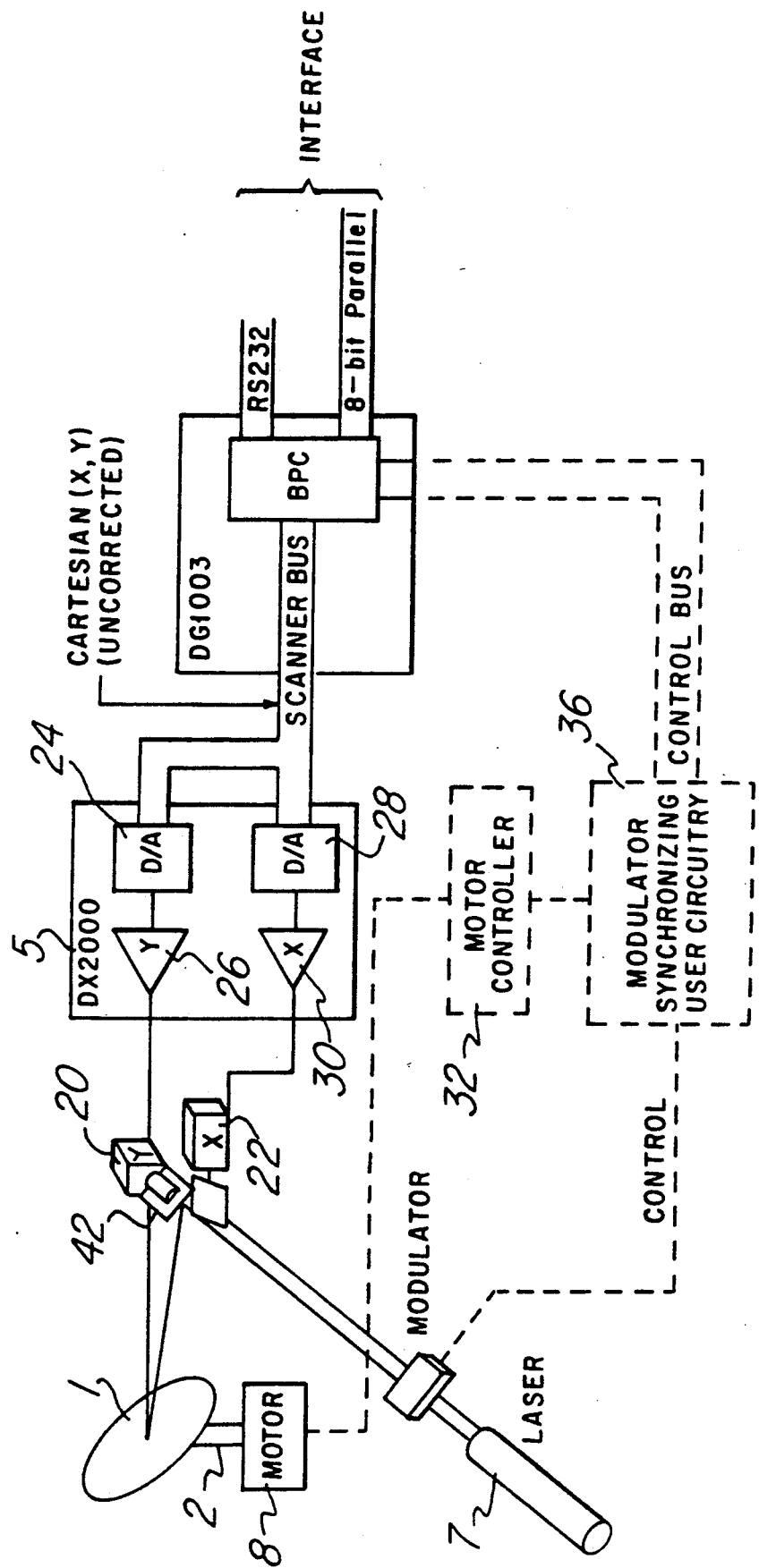
FIG. 2 is a circuit diagram showing synchronization of the scanner with the rotation of the display screen in accordance with the present invention.

The screen 1 is rotated by a motor 8 via a shaft motor 2, the motor speed being controllable by means of a controller (not shown). The motor speed is preferably synchronized with the scanning rate of the scanner 5. One typical circuit for providing such synchronization is shown in FIG. 2 so that the same spot on the screen is always present to receive a particular part of the x-y scan projected thereon. The circuit of FIG. 2 will be explained hereinbelow.

The screen 1 is formed from a pair of intersecting light absorbing disk-shaped members 9 and 10 and can be formed from a standard type movie screen material, such as a lenticular screen, if it is to be viewed from only one side thereof, as for the system described herein thus far. The angle of the disk-shaped member 9 with respect to the image received from the scanner is preferably 45 degrees. However, this angle can be altered about 45 degrees in either direction, the effect of such angle alteration being to vary the height or z-dimension of the displayed image with continued change in such angle. The screen angle is variable on line, if so desired, by a structure (not shown). The second disk-shaped member 10 intersects the member 9 preferably normal thereto, although other angles of intersection can be used and can be, as shown in FIG. 1, a sector of a disk. The member 10 is useful to receive light from a scanner or point source which is positioned off of the axis of the shaft 2 and is preferably utilized to receive such light from a second light source, such as, for example, a source similar to the one described hereinabove and composed of laser 7', modulator 4' and scanner 5', this source being capable of operating concurrently with the laser 7, modulator 4 and scanner 5 or independently therefrom.

Referring now to FIG. 2, wherein like reference numerals refer to like structure as in FIG. 1, the scanner 5 is controlled by signals on the scanner bus which are derived from the control bus. The signals on the control bus are provided by the synchronizing user circuitry which can be manually controlled, such as by the control input thereto. The circuitry 36 also controls the motor controller 32 to control the speed of the motor 8. The circuitry 36 can also control the modulator 4 via modulator control circuitry 34. Such circuitry is well known. The scanner 5 includes a digital-to-analog converter 24 which provides a Y-axis signal via amplifier 26 and a digital-to analog converter 28 which provides an X-axis signal via amplifier 30. The signals from amplifiers 26 and 30 control x-axis and y-axis scanning devices 20 and 22, respectively, which position a mirror 42 which reflects the modulated light beam from the laser 7.

In operation, a light beam from the laser 7 is modulated by the externally controllable modulator 4 to provide a modulated beam 3 which strikes the x-y scanner 5, the latter having an externally controllable scanning rate as determined by signals on the scanner bus and the control bus of FIG. 2. The scanner 5 scans the light beam in an x-y plane via the mirror 42 onto the rotating screen 1, the speed of rotation of the screen 1 being synchronized to the scanning rate of the scanner 5 as explained hereinabove. As has been explained hereinabove, any point of light in the x-y plane impinging upon the screen 1 will impinge upon one or both of the members 9 and 10, depending upon the angle of the beam 6 with the screen 1 and the angle of the member 10 with the member 9 and will display a harmonic type motion in the z-plane due to the similar movement of points on the screen. Accordingly, if the scanning rate of the scanner and the rotation rate of the screen are sufficiently high, light impinging upon the screen at any point on the screen will move along the z-axis sufficiently rapidly to appear as a complete line, as is well known. The result is a three dimensional display with height determined by the angle of the screen. The second light source composed of laser 7', modulator 4' and scanner 5' provides an image on the surfaces 9 and/or 10 in the same manner as described hereinabove for the first light source.

Figure 3:
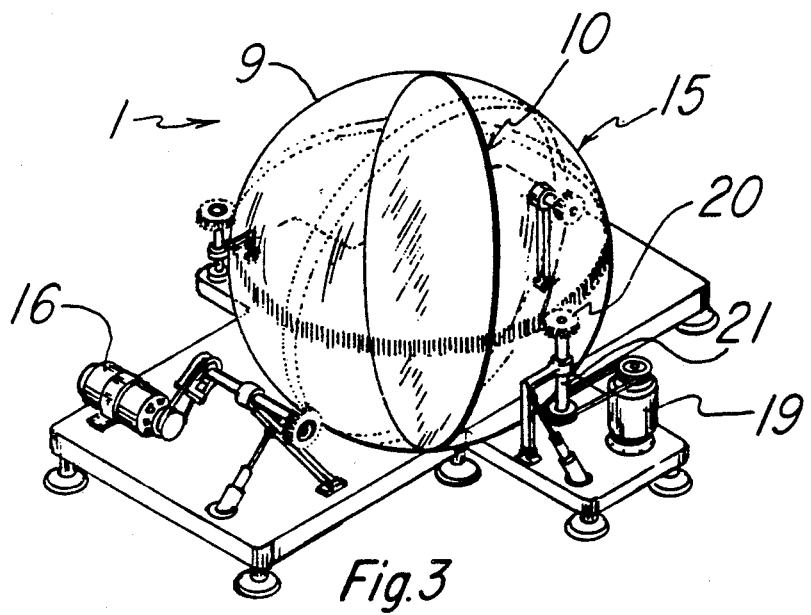
FIG. 3 is a schematic diagram of a system for rotation of a second version of the display of the first embodiment in two different directions.

In accordance with a second version of the first embodiment of the invention, as shown in FIG. 3, the screen 1 is substantially the same as described hereinabove, however the screen is encased within a light transmissive spherical enclosure 15, the enclosure being mounted against any translational motion by being a disk which is mounted at its edges in a clear sphere or in a solid acrylic material which is sectioned and reattached with the disk therein, the screen being capable of only rotational motion about its center. This rotational motion in two different directions is provided by means of a pair of motors 16 and 19, each motor driving a motive element in the form of a gear or frictional element 17 and 20 via a shaft 18 and 21. The gears or frictional elements 17 and 20 each abuts the enclosure 15 and rotate the enclosure in a different direction, preferably orthogonal to each other. The motors 16 and 21 are individually controlled as to speed of rotation by external devices of well known construction (not shown) and can be, for example, stepping motors.

Figure 4:
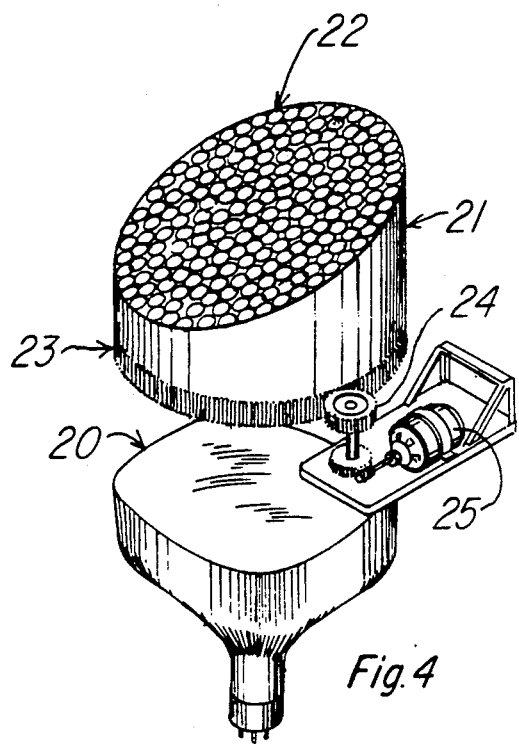
FIG. 4 is an elevational view of a first version of a second embodiment of a display device for use in accordance with present invention.

Referring now to FIG. 4, there is shown a first version of a second embodiment in accordance with the present invention. In accordance with this embodiment, the scanner can be an imagery projector of the type set forth in the prior art, preferably a cathode ray tube 20. The screen 1 of FIG. 1 is replaced by a rotating bank or bundle 21 of fiber optic elements 22. A gear 23 is positioned around and secured to the bundle 21 and circles the axis thereof, the axis preferably being the center of the circle formed by the gear. A second gear 24, driven by a motor 25 meshes with the gear 23 to cause rotation of the fiber bundle 21 about its axis. The motor 25 is controllable in the manner discussed hereinabove.

The fiber optic elements 22 are of standard type and each have a light receiving end adjacent the cathode ray tube 20 and a light transmitting end remote from the cathode ray tube 20. The light receiving ends of all of the fiber optic elements are coplanar and lie in a plane substantially parallel to the face of the cathode ray tube 20. The light transmitting ends of all of the fiber optic elements are coplanar and lie in a plane 26 positioned at an acute angle to the plane of the light receiving ends of the fiber optic elements.

In operation, the output of the cathode ray tube 20 is applied to the rotating bank 21 of fiber optic elements 22. Each spot or pixel on the screen of the cathode ray tube is modulated on and off, as desired, in standard manner. It can be seen that, due to the truncated shape of the surface 26 as described hereinabove, the light emanating from the transmitting end of successive optical fibers 22 passing over a particular pixel or group of pixels will display an undulating or harmonic motion, as in the case of the above noted pending application. This will provide the desired three dimensional image.

Figure 5:
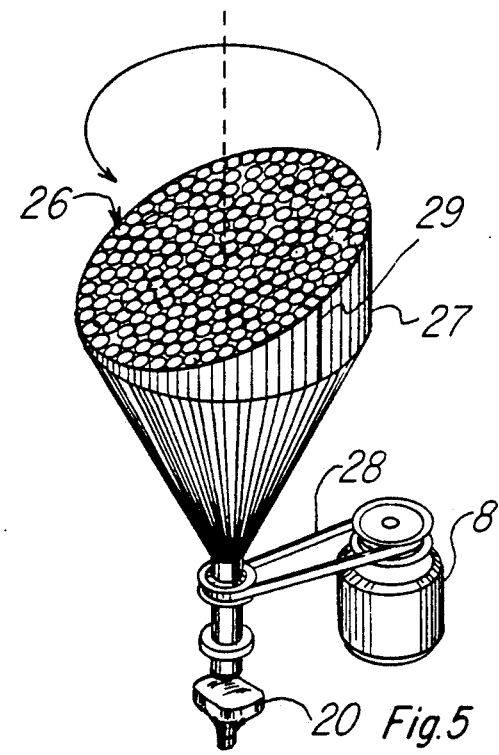
FIG. 5 is an elevational view of a second version of the second embodiment in accordance with the present invention.

Referring now to FIG. 5 there is shown a second version of the second embodiment in accordance with the present invention. In accordance with this version, the fiber optic bank 27 is rotated via the motor 8 which drives a pulley 28 which causes the bank 27 to rotate in known manner. The display from the transmitting end of the fiber optic bank 27 can be enlarged relative to the receiving end thereof at the scanner 20 by compressing or reducing the diameter of each fiber optic element 29 in the direction from transmitting end 26 to receiving end. Alternatively, the fiber optic elements can be compressed together at the receiving ends and spread apart from each other at the transmitting ends to provide an enlarged image at the transmitting end.

Figure 6:
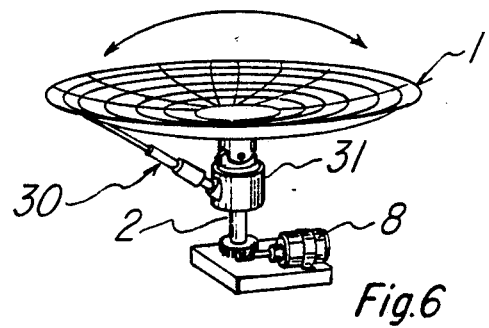
FIG. 6 is a perspective view in accordance with a third embodiment of the present invention.

Referring now to FIG. 6, there is shown a third embodiment in accordance with the present invention. In accordance with this embodiment there is provided an adjustable length rod 30 secured at one end to the screen 1 and at the other end to a drive shaft 31 which rotates with the disk or screen 30 and the shaft 2 which is rotated by the motor 8. The disk 1 is rotatably secured to the rotating member 31 at its axis for rotation about its axis of rotation as shown by the arrow 32 so that the disk can move to a selectively adjustable angle relative to the axis of rotation by adjustment of the length of the rod. The length of the rod can be adjusted manually or electrically, either on or off line, by well known methods, such as by utilizing a manually or automatically controlled rotatable threaded sleeve which will take in or expel threaded rods therein to provide the required length adjustment.

Figure 7:
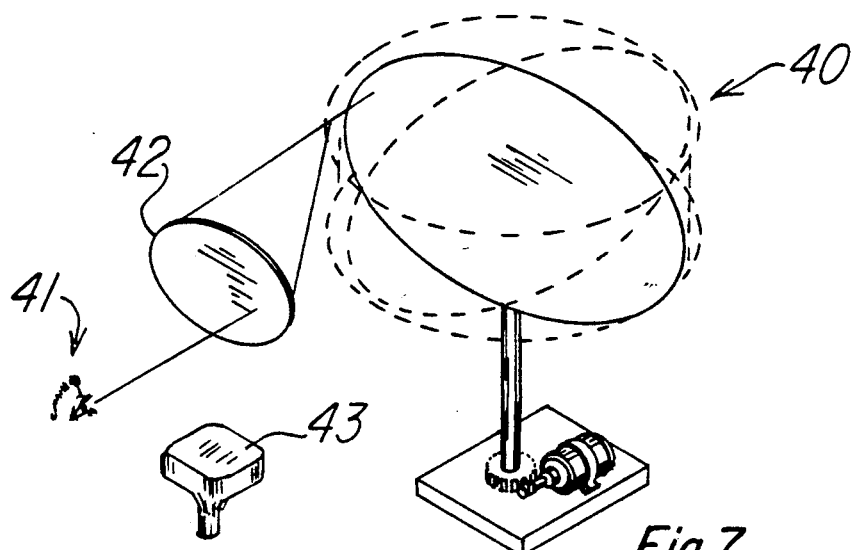
FIG. 7 is a schematic drawing in accordance with a fourth embodiment of the present invention.

Referring now to FIG. 7, there is shown a fourth embodiment in accordance with the invention. In accordance with this embodiment of the invention, there is provided a system for simultaneous viewing of both a three dimensional display of the type set forth in the above noted pending application or the like along with a separate two dimensional display which can be displayed thereover. In this embodiment, the three dimensional display 40 of the type described hereinabove or in the above noted copending application is provided and viewed by the viewer 41 through a beam splitter 42. A second two dimensional display 43 is projected onto the same optical combiner from an angle which is preferably normal to the direction of the three dimensional display 40 on the combiner 41 and which has at least a component of the display therefrom normal to the direction of the three dimensional display. The resultant image will be a combination of the two displays superimposed upon each other and appearing on the combiner 42.

Figure 8:
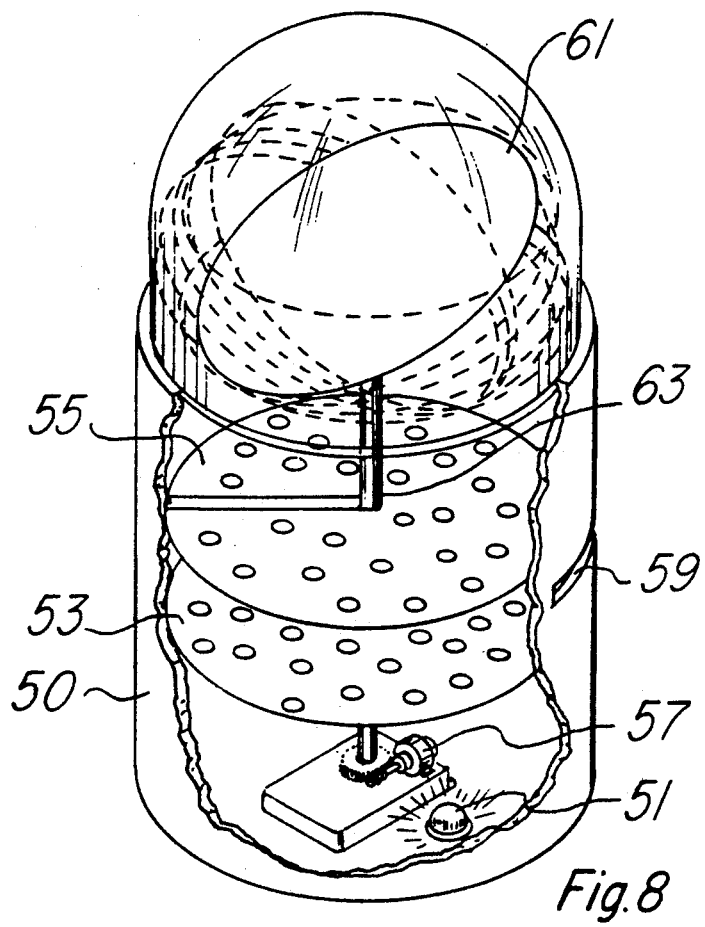
FIG. 8 is a schematic drawing in accordance with a fifth embodiment of the present invention.

Referring now to FIG. 8, there is shown a fifth embodiment in accordance with the present invention. This embodiment includes a housing 50 containing therein a light source 51 which can be an LED, an incandescent light or other appropriate light source. Disposed above the light source 51 are a pair of apertured disks 53 and 55 having aligned apertures which are rotated by a motor 57 via shaft 63. The disks 53 and 55 are replaceable to provide the ability to form different predetermined patterns of the display. A slot 59 is shown to provide this disk interchangeability. The motor 57 also rotates a disk 61 which is on a shaft 63, the disk being at an acute angle to the shaft and the direction of light from the light source 51 through the apertures in the disks 53 and 55 to provide a three dimensional display as described hereinabove.

Figure 9:
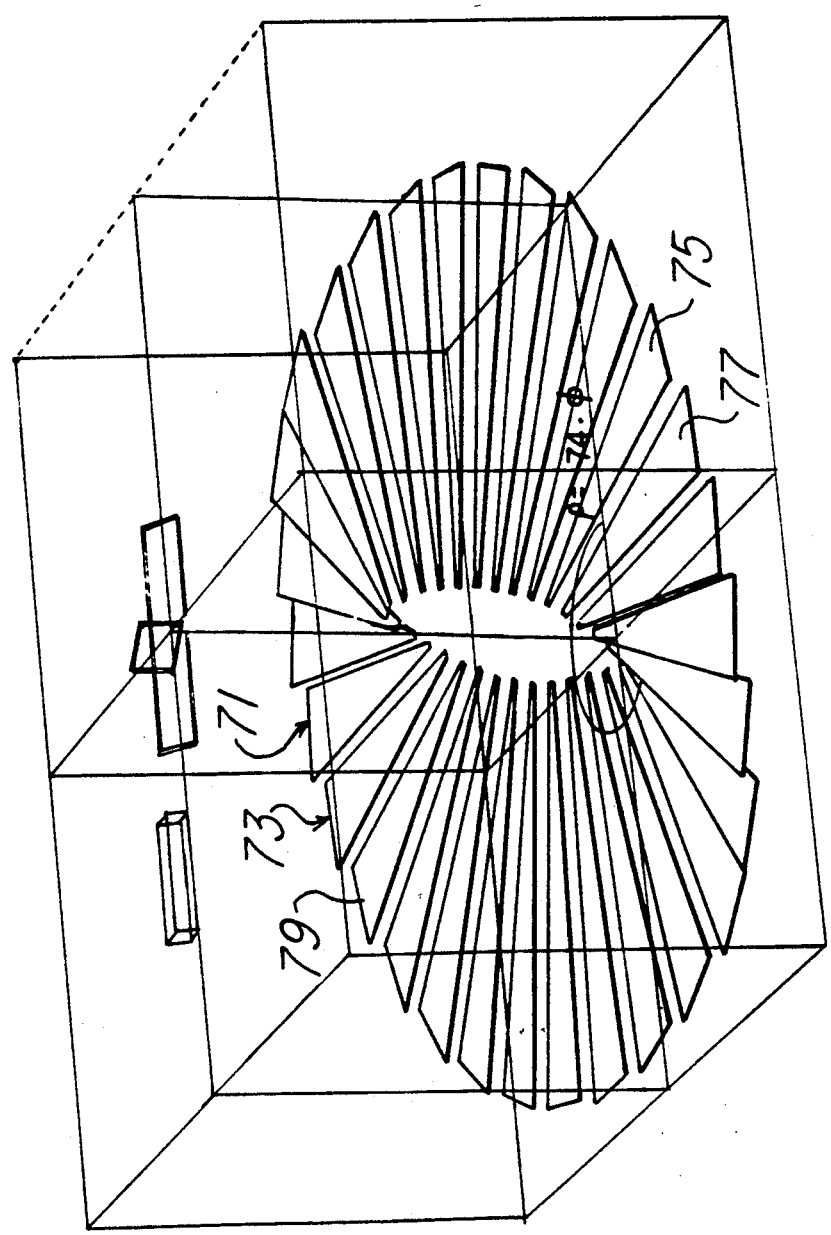
FIG. 9 is a schematic diagram of a split half helix disk arrangement for use in accordance with the present invention.

Referring now to FIG. 9, there is shown an alternate embodiment of a display or screen which can replace the disk as described in conjunction with the first embodiment. The screen includes a plurality of triangular shaped disks 71, half of which are parallel to each other and stepped in the form of a half helix commencing with disk 73 and extending upwardly in a half helical shape to the disk 75. The other half of the disks are symmetrical to the first half of the disks and form a half helix in descending staircase configuration commencing with disk 77 and ending with disk 79. This design provides the harmonic motion and 2X enlargement with the full volume addressability of the helix and two opportunities to address each point in every rotation of the surface. The disks 71 can take other shapes, such as, for example, a substantially rectangular shape. In addition, the stepped surface can be replaced by a smooth helical surface.

It is readily apparent from the above discussion that the two dimensional image to be projected onto the disk of any of the embodiments herein can be provided by a standard cathode ray tube with the image from the tube face being projected onto any rotating disk of the type described herein as well as in the copending application. The two dimensional image is shuttered by turning the bit plane on and off. The pulsing of the bit plane is synchronized with the Z movement in the rotating disk and the image appears on a plane of the three dimensional display. The motion is varied to provide Z displacement in the screen to match the shuttering frequency on the cathode ray tube display. This shows that the time sequenced information can be translated into Z axis depth information on the three dimensional display. Two dimension frames of a three dimensional object are created in separate bit planes on the CRT and are shown in real time on the rotating disk.

Although the invention has been described with respect to specific preferred embodiments thereof, many variations and modifications will immediately become apparent to those skilled in the art. It is therefore the intention that the appended claims be interpreted as broadly as possible in view of the prior art to include all such variations and modification.

We claim:

1. A three dimensional display system comprising:
   (a) a light source for generating a light beam,
   (b) means to form an image from said light beam in a predetermined x-y plane and transmit said image along a predetermined axis passing through said x-y plane; and
   (c) continuously rotating light receiving means having an axis of rotation along said predetermined axis for receiving and displaying said image, said light receiving means being rotatable about said predetermined axis, said light receiving means having a first surface which, in all of its instantaneous states, has contiguous portions thereof at progressively different distances from said x-y plane and a second surface intersecting said first surface.

2. A display system as set forth in claim 1 wherein said first surface is a planar member.

3. A display system as set forth in claim 2 further including means to control one of the speed of rotation of said display and the scanning rate of said means to scan relative to the other.

4. A display system as set forth in claim 2 further including means to control the intensity of said light beam.

5. A display system as set forth in claim 4 further including means to control one of the speed of rotation of said display and the scanning rate of said means to scan relative to the other.

6. A display system as set forth in claim 2 wherein said planar member makes an acute angle with a line normal to said x-y plane.

7. A display system as set forth in claim 6 further including means to control one of the speed of rotation of said display and the scanning rate of said means to scan relative to the other.

8. A display system as set forth in claim 6 further including means to control the intensity of said light beam.

9. A display system as set forth in claim 8 further including means to control one of the speed of rotation of said display and the scanning rate of said means to scan relative to the other.

10. A display system as set forth in claim 9, further including a second light source for generating a second light beam and means to direct said second light beam onto said second surface.

11. A display system as set forth in claim 1 further including means to control one of the speed of rotation of said display and the scanning rate of said means to scan relative to the other.

12. A display system as set forth in claim 1, further including a second light source for generating a second light beam and means to direct said second light beam onto said second surface.

13. A three dimensional display system comprising:
    (a) a light source;
    (b) a pair of parallel apertured rotating disks having aligned apertures adjacent said light source for passing light from said light source through said apertures; and
    (c) a rotating disk disposed at an acute angle to said apertured disks and disposed on the side of said apertured disks remote from said light source to receive said light thereon which passes through said apertures.

14. A display system as set forth in claim 1 further including means to control the intensity of said light beam.

15. A display system as set forth in claim 14, further including a second light source for generating a second light beam and means to direct said second light beam onto said second surface.

16. A display system as set forth in claim 14 further including means to control one of the speed of rotation of said display and the scanning rate of said means to scan relative to the other.

17. A display system as set forth in claim 16, further including a second light source for generating a second light beam and means to direct said second light beam onto said second surface.

18. A three dimensional display system comprising:
    (a) a light source for generating a light beam,
    (b) means to form an image from said light beam in a predetermined x-y plane and transmit said image along a predetermined axis passing through said x-y plane;
    (c) continuously rotating light receiving means having an axis of rotation along said predetermined axis for receiving and displaying said image, said light receiving means being rotatable about said predetermined axis, said light receiving means having a first surface which, in all of its instantaneous states, has contiguous portions thereof at progressively different distances from said x-y plane and a second surface intersecting said first surface;
    (d) a substantially spherical light transmissive enclosure fixedly enclosing said light receiving means therein; and
    (e) means to rotate said enclosure in two different directions simultaneously.

19. The display system of claim 18 wherein said enclosure is transparent and wherein said means to rotate includes first means to rotate said enclosure in a first direction about its center and second means to rotate said enclosure in a second direction different from said first direction and about its center simultaneously therewith.

20. The display system of claim 17 wherein said two different directions are orthogonal to each other.

21. The display system of claim 19 wherein said two different directions are orthogonal to each other.

22. A three dimensional display system comprising:
    (a) a light source for generating a light beam,
    (b) means to form an image from said light beam in a predetermined x-y plane and transmit said image along a predetermined axis passing through said x-y plane;
    (c) continuously rotating light receiving means having an axis of rotation along said predetermined axis for receiving and displaying said image, said light receiving means being rotatable about said predetermined axis, said light receiving means having a plurality of light conducting members, each said member having a light receiving end and a light transmitting end, all of said light receiving ends lying in a plane parallel to said predetermined x-y plane, all of said light transmitting ends lying in a plane making an acute angle with said x-y plane; and (d) means to rotate said light receiving means about said axis of rotation.

23. The display of claim 22 wherein said the area of said light transmitting end is greater than the area of said light receiving end.

24. The display of claim 22 wherein each said light conducting member has a greater cross section at the light transmitting end thereof than at the light receiving end thereof.

25. The display of claim 23 wherein each said light conducting member has a greater cross section at the light transmitting end thereof than at the light receiving end thereof.

26. The display of claim 24 wherein the cross section of each said light conducting member continuously decreases from said light transmitting end to said light receiving end thereof.

27. The display of claim 25 wherein the cross section of each said light conducting member continuously decreases from said light transmitting end to said light receiving end thereof.

28. A three dimensional display system comprising:
(a) a light source for generating a light beam,
(b) means to form an image from said light beam in a predetermined x-y plane and transmit said image along a predetermined axis passing through said x-y plane;
(c) continuously rotating light receiving means having an axis of rotation along said predetermined axis for receiving and displaying said image, said light receiving means being rotatable about said predetermined axis and lying in a plane making an acute angle with said x-y plane;
(d) adjustable means to vary said acute angle; and
(e) means to rotate said light receiving means about said axis of rotation.

29. The display of claim 28 wherein said adjustable means includes variable length rod means rotatable with said light receiving means and coupled thereto to rotate said light receiving means relative to said axis.

30. The display of claim 28 further including means to vary said adjustable means on-line.

31. The display of claim 29 further including means to vary said adjustable means on-line.

32. The display of claim 28 further including means coupled to a region of said light receiving means along said axis to rotate with said light receiving means at selected acute angles relative to said axis, said adjustable means being coupled to an exterior portion of said light receiving means to cause rotation of said light receiving means relative to said axis.

33. The display of claim 29 further including means coupled to a region of said light receiving means along said axis to rotate with said light receiving means at selected acute angles relative to said axis, said adjustable means being coupled to an exterior portion of said light receiving means to cause rotation of said light receiving means relative to said axis.

34. The display of claim 30 further including means coupled to a region of said light receiving means along said axis to rotate with said light receiving means at selected acute angles relative to said axis, said adjustable means being coupled to an exterior portion of said light receiving means to cause rotation of said light receiving means relative to said axis.

35. The display of claim 31 further including means coupled to a region of said light receiving means along said axis to rotate with said light receiving means at selected acute angles relative to said axis, said adjustable means being coupled to an exterior portion of said light receiving means to cause rotation of said light receiving means relative to said axis.

36. A three dimensional display system comprising:
(a) a light source for generating a light beam,
(b) means to form an image from said light beam in a predetermined x-y plane and transmit said image along a predetermined axis passing through said x-y plane; and
(c) continuously rotating light receiving means having an axis of rotation along said predetermined axis for receiving and displaying said image, said light receiving means being rotatable about said predetermined axis, said light receiving means having a first surface in the form of a partial turn of a helix and a second surface in the form of a partial turn of a helix symmetrical with said first surface.

37. The display of claim 36 wherein each said partial turn is composed of a plurality of stepped surfaces.

38. The display of claim 37 wherein said surfaces are one of substantially triangular or substantially rectangular shape.

39. The display of claim 36 wherein said first and second surfaces display mirror image symmetry.

40. The display of claim 37 wherein said stepped surfaces display mirror image symmetry.

41. The display of claim 38 wherein said surfaces display mirror image symmetry.

42. The display of claim 36 wherein said partial turn is a half turn.

43. The display of claim 37 wherein said partial turn is a half turn.

44. The display of claim 38 wherein said partial turn is a half turn.

45. The display of claim 39 wherein said partial turn is a half turn.

46. The display of claim 40 wherein said partial turn is a half turn.

47. The display of claim 41 wherein said partial turn is a half turn.

48. The display of claim 36 wherein a vertical projection of said first and second surfaces substantially forms a circle.

49. The display of claim 37 wherein a vertical projection of said first and second surfaces substantially forms a circle.

50. The display of claim 39 wherein a vertical projection of said first and second surfaces substantially forms a circle.

51. The display of claim 45 wherein a vertical projection of said first and second surfaces substantially forms a circle.

52. The display of claim 1 wherein said means to form an image from said light beam in a predetermined x-y plane and transmit said image along a predetermined axis passing through said x-y plane is a cathode ray tube.

53. The display of claim 36 wherein said means to form an image from said light beam in a predetermined x-y plane and transmit said image along a predetermined axis passing through said x-y plane is a cathode ray tube.

54. The display of claim 13 further including means to rotate each of said disks together at the same rotational speed.

55. The display of claim 13 wherein said apertured disks are replaceable.

56. The display of claim 13 wherein said apertured disks are replaceable.

* * * * *